United States Patent Office

3,728,105
Patented Apr. 17, 1973

3,728,105
EXTRACTION OF METAL VALUES FROM MANGANESE DEEP SEA NODULES
Roald R. Skarbo, Lexington, Mass., assignor to Kennecott Copper Corporation, New York, N.Y.
No Drawing. Filed Nov. 16, 1970, Ser. No. 90,131
Int. Cl. C22b *3/00, 5/00, 15/10*
U.S. Cl. 75—103                                     11 Claims

ABSTRACT OF THE DISCLOSURE

Copper, nickel, cobalt and molybdenum may be leached from deep sea manganese nodules using an aqueous ammoniacal ammonium solution at elevated temperatures and pressures.

BACKGROUND OF THE INVENTION

With the quantity and quality of the world's reserves of copper, nickel, cobalt and molybdenum rapidly diminishing the metallurgical industry is continually looking for better ways of increasing the recovery of present mineral sources and is vigilant in attempting to develop economically attractive processes to recover metal values from ores believed to be of little economic value. Pelagic sedimentary materials containing significant quantities of metal values have been known since late in the nineteenth century, however, no attempts have been made to recover the metal values therefrom. These pelagic sedimentary materials are considered to be complex ores which do not lend themselves to currently known extractive metallurgical processing techniques. Up to the present time these complex ores have only been found to the deep-sea floor of the oceans and lakes. Terrestrial ore beds containing manganese, iron, copper, nickel, molybdenum, cobalt and other metal values in the same deposit have not as yet been discovered. However it is not unlikely that the same or similar type of complex ores will be located as terrestrial deposits. For the purpose of the remainder of this patent specification these complex ores will be variously referred to as deep sea nodules, deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. A mechanical deep sea nodule harvester is described in U.S. Pat. No. 3,480,326.

The nodules invariably show an onionskin or concentric layer structure and are frequently oolitic within individual layers. However the nodules have no overall crystalline structure. The literature tells us that the nodules consist of a number of intimately and randomly intergrown crystallites of many minerals among which are barite, rutile, anatase, goethite, and several apparently new minerals of manganese. Attempts have been made to characterize these new manganese minerals by X-ray diffraction, electron diffraction and electron probe investigation without much success. Copper and nickel ore are not present in the nodule in the usual form found in terrestrial ores. It has been postulated that copper and nickel are present in the nodule as a result of a substitution mechanism. It has not been possible, therefore, to determine the best method of extracting the mineral values from the deep sea manganese nodules particularly copper, nickel, cobalt and molybdenum.

The character and chemical content of the deep sea nodules may vary widely depending upon the region from which the nodules are obtained. For a detailed chemical analysis of nodules from the Pacific Ocean see pages 449 and 450 in The Encyclopedia of Oceanography, edited by R .W. Fairbridge, Reinhold Publishing Corp., N.Y., 1966, and U.S. Pat. No. 3,169,856. For the purpose of this invention the complex ores will be considered as containing the following approximate metal content range on a dry basis.

Metal content analysis range

|            | Percent    |
|------------|------------|
| Copper     | 0.8–1.8    |
| Nickel     | 1.0–2.0    |
| Cobalt     | 0.1–0.5    |
| Molybdenum | 0.03–0.1   |
| Manganese  | 10.0–40.0  |
| Iron       | 4.0–25.0   |

The remainder of the ore consists of clay minerals with lesser amounts of quartz, apatite, biotite and sodium and potassium feldspars. Of the many ingredients making up the manganese nodules, copper and nickel are emphasized because, from an economic standpoint, they are the most significant metals in most of the ocean floor ores. Cobalt and molybdenum may also be recovered by the process of this invention.

The mining of the vast reserves of manganese deep sea nodules lying over the ocean floor, can best be economically justified, were a more economical process available to effect separation and ultimate recovery of the copper and nickel elements. The recovery of molybdenum and cobalt from these complex ores is also of economic interest.

Accordingly, among the objects of this invention are to provide a novel and improved process for extracting the copper and nickel from the complex ores or manganese deep sea nodules. Another object is to provide a novel and improved process for extracting copper and nickel which process shall be simple and straightforward. Another object is to provide a novel and improved process for extracting copper and nickel as found in manganese deep sea nodules, which process, at the same time facilitates the recovery of the cobalt and molybdenum elements contained in the nodules.

SUMMARY OF INVENTION

Copper, nickel, cobalt and molybdenum are extracted from deep sea manganese nodules by the process of this invention which comprises the steps of charging manganese deep sea nodules and a leach solution of aqueous ammonia and an ammonium salt or sodium chloride to a pressure vessel or an autoclave to provide a liquid-solids suspension and heating the liquid-solids suspension to effect reduction of the tetravalent manganese phase of the nodules whereby the nickel, copper, cobalt and molybdenum in the deep sea manganese nodule report to the leach solution. The metal values may then be recovered from the leach solution using conventional technology.

In another embodiment of the invention a reducing gas is introduced prior to heating the liquid-solid suspension. In this process the reduction of the tetravalent manganese phase is predominantly effected by the reducing gas used.

Manganese nodules as recovered from the ocean floor vary considerably in size, i.e. from about 0.5 cm. to as large as 25 cm. in diameter or larger and generally average about 3 cm. in diameter. Nodules as received may be processed by the method of this invention for extraction of the metal values of copper, nickel, cobalt and molybdenum. However it is preferred to reduce the nodules to smaller and more uniform size distribution to increase the recovery of the metal values. It is preferred to grind or crush the nodules so that they will pass through Sieve No. 10, U.S. Sieve Series. The sieve opening in Sieve No. 10 is 0.0787 inch. The process of this invention works equally as well on nodules ground or crushed to pass through Sieve Numbers 60 and 100, U.S. Sieve Series. Sieve No. 60 and No. 100 have sieve openings of 0.0098 and .0059 inch respectively.

After the nodules have been ground to a minus 10 mesh, i.e. will pass through Sieve No. 10, they are mixed with the leach solution. The leach solution consists of ammonia and an ammonium salt or sodium chloride in water. The preferred ammonium salts are ammonium chloride, $NH_4Cl$; ammonium carbonate, $(NH_4)_2CO_3$; and ammonium sulfate, $(NH_4)_2SO_4$. Preferably the ammonium salt concentration will be about 1 molar and may be as high as 6 molar. Ammonia concentration may be varied from about 50 gm. per liter of leach solution to about 200 gm. per liter of leach solution or more. Increasing the ammonia concentration above 100 gm. per liter of leach solution does not appreciably increase efficiency of the process. When sodium chloride is used in place of the ammonium salt it is preferred to use at least about 3% sodium chloride (and sea water provides such a concentration) and up to about 20% sodium chloride in the leach solution.

In the next step the solid-liquid suspension of nodules and leach solution are charged to a pressure vessel or autoclave. At this point, if desired an inert purging gas or reducing gas may be introduced into the vessel. An inert purging or reducing gas is not essential to the reduction of the manganese but will tend to drive out any oxidizing atmosphere remaining in the vessel. The contents of the pressure vessel or autoclave are then heated to a temperature of from about 150 to about 300° C., preferably between about 200 and 250° C. When an autoclave is used super-heated steam under pressure may be used as the heating medium. Any convenient means may be used for heating the pressure vessel. When the contents, i.e. the solid-liquid suspension of nodules and leach solution, of the autoclave or pressure vessel have attained the selected temperature the heating means may be withdrawn or the heat may be adjusted to maintain the selected temperature as long as four hours or more. Preferably the nodule-leach solution suspension is maintained at selected temperature for at least 30 minutes. No significant increase in recovery of copper, nickel, cobalt and molybdenum is obtained by maintaining the selected temperature longer than about two hours.

The maximum pressure in the pressure vessel or autoclave will depend upon the initial gas pressure in the vessel, upon the amount of reagents in the vessel and upon the selected temperature. Maximum pressure may range from about 300 to about 1000 p.s.i.g. The maximum gauge pressure is temperature dependent and relatively small temperature variations will cause relatively large fluctuations in pressure during the time the vessel contents remain at the selected temperature. Preferably the maximum should be at least about 450 to 550 p.s.i.g.

When the nodule-leach solution suspension has remained at the selected temperature for the required time the suspension is withdrawn from the vessel in any convenient manner. The leach solution, now rich in copper, nickel, cobalt and molybdenum, is separated from the residue by filtration, decantation or other solid-liquid separation method. The metal values are then recovered from the leach solution by, for example, precipitation, electrowinning techniques, liquid-liquid extraction, ion exchange, etc.

In the second embodiment of this invention, i.e. when a reducing gas is introduced into the reaction vessel, the reducing gas may be carbon monoxide, hydrogen, mixtures of carbon monoxide and hydrogen, water gas, producer gas, synthesis gas, mixtures of carbon monoxide and nitrogen, mixtures of carbon monoxide and carbon dioxide. Inert purging gases may be such gases as nitrogen and argon or mixtures thereof. The reducing gas or inert purging gas may, if desired, be introduced into the pressure vessel to provide an overpressure as high as 300 p.s.i.g. or higher.

When manganese nodules are treated in an ammoniacal solution at elevated temperatures under pressure the tetravalent manganese in the nodules is apparently reduced to the trivalent state, probably according to the reaction

when a reducing gas such as carbon monoxide is present, the tetravalent manganese is reduced to the divalent state according to the reaction

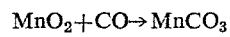

The explanation of why the copper, nickel and cobalt in the manganese nodule is rendered leachable in the presence of these reactions is not known. However it is theorized that the valuable mineral constituents are held in the complex ore by some substitution mechanism. By changing the character of the manganese compound into which the valuable mineral constituents are complexed, it is believed that such complex is broken down and the valuable mineral constituents are released in soluble form.

The following specific examples are illustrative but not limitative of my invention, it being understood that similar results are obtainable with other combinations of conditions other than those specifically considered in the examples. All such variations which do not depart from the basic concept of the invention disclosed above are intended to come within the scope of the appended claims.

Example I

Ten grams of manganese nodules, ground to minus 100 mesh U.S. Sieve Series was added to 400 ml. of a leach solution containing 100 g. $NH_3$/liter and 3 molar $NH_4Cl$. The reaction mixture was transferred to an externally heated autoclave. After purging the autoclave with nitrogen to secure an oxygen-free atmosphere the contained suspension was heated to 200° C. and maintained at that temperature for 30 minutes under agitation. The maximum pressure at 200° C. was about 575 p.s.i.g. The suspension was then cooled to essentially room temperature, removed from the autoclave and subsequently filtered. Chemical analysis of the leach residue showed that about 40% of the tetravalent manganese phase ($Mn^{+4}$) of the nodules had been reduced to the trivalent state ($Mn^{+3}$) during the leaching.

Example II

Four leach solutions of the following composition were prepared (a) 100 g. $NH_3$/liter, 3 molar $NH_4Cl$
(b) 100 g. $NH_3$/liter, 3 molar $(NH_4)_2SO_4$
(c) 100 g. $NH_3$/liter, 3 molar $(NH_4)_2CO_3$
(d) 100 g. $NH_3$/liter Ten grams of deep sea manganese nodules were added to 400 ml. of each of the four leach solutions. The manganese nodules and leach solutions were then heated in autoclaves at desired temperatures for 60 minutes under a nitrogen atmosphere. Chemical analysis of the leach solutions and the residues were used to calculate the percentage of copper and nickel extracted for each case. The results obtained were as follows:

| Leach solution | Leach temperature, °C. | Maximum pressure, p.s.i.g. | Extractions (percent) | |
|---|---|---|---|---|
| | | | Copper | Nickel |
| 100 g. NH₃/liter, 3 molar NH₄Cl | 200 | 400 | 89 | 75 |
| 100 g. NH₃/liter, 3 molar (NH₄)₂SO₄ | 200 | 390 | 90 | 77 |
| 100 g. NH₃/liter, 3 molar (NH₄)₂CO₃ | 150 | 350 | 79 | 69 |
| 100 g. NH₃/liter | 200 | 400 | 3 | 1 |

Example II shows that ammonia alone under the conditions of this example does not extract copper and nickel from manganese nodules. However solutions containing ammonia and an ammonium salt will, at elevated temperature, extract significant quantities of copper and nickel from deep sea nodules.

Example III

This example shows the effects of leach temperature on the quantity of valuable metals extracted during leaching of manganese nodules in ammoniacal solutions.

Three reaction mixtures were prepared, each consisting of ten grams of nodules in 400 ml. of leach solution containing 100 g. NH₃/liter and 6 molar NH₄Cl. Each reaction mixture was leached in an autoclave for 60 minutes under nitrogen atmosphere, and at a temperature of 200, 225 and 250° C., respectively. Based on chemical analysis of the leach solutions and residues, the following extractions were calculated:

| Leach temperature, °C. | Maximum pressure, p.s.i.g. | Extractions (percent) | | | |
|---|---|---|---|---|---|
| | | Cu | Ni | Co | Mo |
| 200 | 340 | 90 | 78 | 42 | 79 |
| 225 | 500 | 93 | 83 | 71 | 82 |
| 250 | 700 | 95 | 85 | 84 | 87 |

The results of Example III show that substantially all of the copper, nickel and molybdenum are extracted at a leach temperature of 200° C. A temperature of at least 225° C. is required, however, if recovery of essentially all the cobalt contained in the nodules is required.

Example IV

This example shows the effects of leaching time on the percentage of metal values recovered from deep sea nodules by leaching in ammoniacal solution at elevated temperature.

Four samples of nodules were leached successively in an autoclave at 250° C. and under a nitrogen atmosphere. In each experiment, ten grams of nodules and 400 ml. of leach solution was used. The fresh leach solution contained 100 g. NH₃/liter and 6 molar NH₄Cl. A different leach time was used for each experiment, the time at temperature ranging from zero (cooling autoclave upon reaching 250° C.) to 60 minutes. The results of these experiments were as follows:

| Time at temperature (min.)— | Maximum pressure, p.s.i.g. | Extractions (percent) | | | |
|---|---|---|---|---|---|
| | | Cu | Ni | Co | Mo |
| 0 | 690 | 92 | 80 | 67 | 85 |
| 10 | 700 | 93 | 82 | 76 | 82 |
| 30 | 700 | 95 | 85 | 82 | 88 |
| 60 | 700 | 95 | 85 | 84 | 87 |

Example IV shows that under the conditions of this example, a leach time of 30 minutes is sufficient for maximum extraction of the elements of interest.

Example V

This example illustrates the effects of the ammonium salt concentration of the leach solution on the percentage of metals extracted from the nodules. The experiments of this example were made at a leach temperature of 200° C., a leach time of 60 minutes and leach solutions containing 100 g. NH₃/liter and ranging from zero to 6 molar NH₄Cl. Other conditions were identical to those given in Example IV. The results of these experiments were as follows:

| NH₄Cl concentration (molar) | Maximum pressure, p.s.i.g. | Extractions (percent) | | | |
|---|---|---|---|---|---|
| | | Cu | Ni | Co | Mo |
| 0 | 400 | 3 | 1 | 1 | 82 |
| 1 | 400 | 82 | 46 | 4 | 79 |
| 3 | 345 | 88 | 71 | 13 | 78 |
| 6 | 340 | 90 | 78 | 42 | 79 |

The results of Example V shows that at least one molar NH₄Cl is required for maximum copper extraction and at least 3 molar for maximum nickel extraction. The extraction of cobalt increases as the NH₄Cl concentration is increased, whereas the extraction of molybdenum is essentially independent of the NH₄Cl concentration.

Example VI

This example shows the effects of the free ammonia concentration of the leach solution on the percentage of nickel values recovered from nodules by leaching in ammoniacal solution at elevated temperature.

The experiments of this example were made at a leach temperature of 250° C., of leach time of 30 minutes, using leach solutions of 6 molar NH₄Cl and free ammonia ranging from 50 to 150 grams per liter. Other conditions were identical to those given in Example IV. The results of these experiments were as follows:

| Free ammonia concentration (grams/liter) | Maximum pressure, p.s.i.g. | Extractions (percent) | | | |
|---|---|---|---|---|---|
| | | Cu | Ni | Co | Mo |
| 50 | 600 | 94 | 69 | 75 | 82 |
| 100 | 700 | 95 | 85 | 82 | 88 |
| 150 | 800 | 95 | 86 | 88 | 75 |

The results of Example VI show that, over the ammonia concentration range investigated, (a) the copper extraction is essentially independent of the free ammonia concentration;
(b) the nickel extraction is not significantly affected by the free ammonia concentration above 100 g./l.
(c) the cobalt extraction increases as the free ammonia concentration is increased.
(d) the molybdenum extraction is not affected to a great extent by the free ammonia concentration.

Example VII

Ten grams of manganese nodules, ground to −100 mesh, was added to 400 ml. of a solution containing 100 g. NH₃/liter and one molar NH₄Cl. The suspension was charged to an autoclave, which subsequently was purged with argon for 60 minutes to remove atmospheric oxygen. Carbon monoxide was then introduced until a pressure of 50 p.s.i.g. was reached, followed by heating of the reaction mixture to 300° C. After 4 hours at temperature, the autoclave was cooled to room temperature and the contained reaction mixture was collected. The suspension was subsequently filtered and the leach residue washed with 100 ml. of 5% NH₃. X-ray diffraction analysis confirmed that the manganese phase of the leach residue was mainly present as manganese carbonate. The result of Example VII shows that carbon monoxide had reduced the tetravalent manganese phase ($Mn^{+4}$) of the original nodule sample to the divalent oxidation state ($Mn^{+2}$).

Example VIII

Ten grams of manganese nodules, ground to —100 mesh, was added to 400 ml. of a solution containing 100 grams of $NH_3$ per liter and one molar $NH_4Cl$. The suspension was charged to an autoclave, which subsequently was purged with argon for 60 min. to remove atmospheric oxygen. Carbon monoxide was then introduced until a pressure of 100 p.s.i.g. was reached, followed by heating of the reaction mixture to 200° C. Maximum pressure at that temperature was 500 p.s.i.g. After 4 hours at temperature, the autoclave was cooled to room temperature and the contained reaction mixture collected. The suspension was subsequently filtered and the leach residue washed with 100 ml. of 5% $NH_3$.

Chemical analyses of the residue and the leach solution revealed that the leach procedure described above yielded 95% extraction of the copper and 83.8% extraction of the nickel contained in the original nodule sample. Only 2.6% of the manganese was extracted.

Recovery of copper and nickel from the leach solution can be accomplished by known methods.

Example IX

This example shows the effects of leach temperature and carbon monoxide pressure on the amounts of metal values recovered from manganese nodules by leaching in ammoniacal solution at elevated temperature. The experimental procedure used in the experiments of this example was identical to that described in Example VIII, except that different leach temperatures and initial carbon monoxide pressures were used. The latter parameters ranged from 100–300° C. and from 50–270 p.s.i.g., respectively. The metal recoveries obtained in these experiments were as follows:

| Leach temperature, ° C. | Initial carbon monoxide pressure, p.s.i.g. | Maximum pressure, p.s.i.g. | Metal extractions (percent) | | | |
|---|---|---|---|---|---|---|
| | | | Cu | Ni | Co | Mo |
| 300 | 50 | | 91 | 16 | 75 | 26 |
| 250 | 50 | 950 | 93 | 16 | 14 | 19 |
| 250 | 100 | 810 | 94 | 5 | 2 | 25 |
| 200 | 100 | 500 | 95 | 84 | 38 | 90 |
| 200 | 200 | 600 | 94 | 87 | 54 | 54 |
| 150 | 100 | 280 | 79 | 59 | 10 | 83 |
| 100 | 200 | 300 | 70 | 51 | 1 | 78 |
| 100 | 270 | 400 | 72 | 51 | 2 | 73 |

The results of Example IX show, that under the conditions of the example, a leach temperature of about 200° C. and an initial carbon monoxide pressure of at least 100 p.s.i.g. should be used for obtaining maximum extraction of the metals of interest. A leach temperature much above 200° C. will result in a sharply decreased extraction of nickel.

Example X

This example shows the effects of leaching time on the amounts of copper and nickel recovered from manganese nodules by leaching in ammoniacal solution at elevated temperature.

The experimental conditions used in the experiments of this example were identical to those used in Example VIII, i.e. initial CO pressure 100 p.s.i.g. and heated to 200° C., except for the leaching time which was varied from 30 to 240 minutes. The experimental results were as follows:

| Leach time, minutes | Maximum pressure, p.s.i.g. | Extractions, (percent) | |
|---|---|---|---|
| | | Cu | Ni |
| 30 | 525 | 83 | 67 |
| 60 | 500 | 90 | 80 |
| 120 | 510 | 95 | 84 |
| 240 | 500 | 95 | 84 |

The results of this example show that, under the experimental conditions of the example, a leach time of at least 60 minutes is required for extracting substantially all the copper and nickel values contained in manganese nodules.

Example XI

Three leach solutions containing 100 g. $NH_3$/liter were made up. In addition to ammonia, two of the solutions contained one and 3 molar $NH_4Cl$, respectively. Ten grams of manganese nodules were added to 400 ml. of each of the three leach solutions. The nodules and leach solutions were then subjected to autoclave leaching according to the procedure of Example VIII i.e., initial CO pressure and heated to 200° C. The initial carbon monoxide pressure was 100 p.s.i.g. and the leaching time was 30 minutes. The amounts of copper and nickel extracted were as follows:

| Leach solution | Maximum pressure, p.s.i.g. | Extractions (percent) | |
|---|---|---|---|
| | | Cu | Ni |
| 100 g. $NH_3$/liter | 515 | 81 | 34 |
| 100 g. $NH_3$/liter, 1 molar $NH_4Cl$ | 525 | 83 | 67 |
| 100 g. $NH_3$/liter, 3 molar $NH_4Cl$ | 520 | 81 | 74 |

The results of this example show that at least one molar $NH_4Cl$ is required to obtain maximum extraction of both copper and nickel. An increase of the $NH_4Cl$ concentration above one molar, has only a minor beneficial effect on the nickel extraction. The copper extraction is essentially unchanged.

Example XII

This example illustrates the use of NaCl in place of $NH_4Cl$ in the process of pressure leaching of nodules in ammoniacal solution and under a carbon monoxide atmosphere. The experiments were carried out in accordance with the procedure of Example VIII. In all tests, a leach temperature of 200° C., an initial carbon monoxide pressure of 100 p.s.i.g. and a solid to liquid ratio of 1:40, was used. The results of these experiments for various conditions of leach time and leach solution composition were as follows:

| Composition of leach solution | | Leach time, minutes | Maximum pressure, p.s.i.g. | Extractions (percent) | | | |
|---|---|---|---|---|---|---|---|
| $NH_3$ (g./liter) | NaCl (percent) | | | Cu | Ni | Co | Mo |
| 100 | Nil | 30 | 515 | 81 | 34 | 5 | 59 |
| 100 | 3.1 | 30 | | 82 | 37 | 10 | 83 |
| 100 | 6.2 | 30 | 515 | 84 | 43 | 12 | 82 |
| 100 | 12.4 | 30 | 480 | 87 | 49 | 16 | 84 |
| 100 | 3.1 | 60 | | 89 | 58 | 16 | 80 |
| 100 | 3.1 | 120 | 490 | 91 | 55 | 11 | 83 |
| 100 | 3.1 | 240 | 500 | 93 | 57 | 13 | 88 |
| 200 | 3.1 | 30 | | 88 | 69 | 22 | 71 |
| 200 | 3.1 | 60 | 660 | 91 | 82 | 31 | 65 |
| 200 | 3.1 | 120 | 720 | 94 | 84 | 33 | 75 |

Example XIII

This example illustrates the use of a mixture of carbon monoxide and hydrogen as a reducing gas in place of pure carbon monoxide, in the process of pressure leaching of manganese nodules in ammoniacal solution. Ten grams of manganese nodules were added to 400 ml. of a solution containing 100 g. $NH_3$/liter and one molar $NH_4Cl$. The suspension was charged to an autoclave, which subsequently was purged with argon to remove atmospheric oxygen. A mixture of hydrogen and carbon monoxide, analyzing 38.5% hydrogen and 61.5% carbon monoxide, was then introduced until an initial pressure of 100 p.s.i.g. was reached, followed by heating of the reaction mixture to 200° C. After 60 minutes at temperature, chemical analysis revealed that 90% Cu, 62% Ni, 23% Co and 42% Mo had been extracted from the original nodule sample.

Example XIV

This example illustrates the use of $(NH_4)_2SO_4$ in place of $NH_4Cl$ in the process of pressure leaching of manganese nodules in ammoniacal solution. The experimental conditions were identical to those of Example XIII, i.e., initial $CO/H_2$ pressure 100 p.s.i.g. and heated to 200° C., except that a leach solution containing 100 g. $NH_3$/liter and one molar $(NH_4)_2SO_4$ was used. Maximum pressure at temperature was about 530 p.s.i.g. The following extractions were obtained: 87% Cu, 69% Ni, 38% Co and 41% Mo.

Example XV

This example illustrates the use of $(NH_4)_2CO_3$, and a mixture of $(NH_4)_2CO_3$ and NaCl, in place of $NH_4Cl$ in the process of pressure leaching of manganese nodules in ammoniacal solution and under a reducing atmosphere. A leaching time of 60 minutes, and an initial carbon monoxide pressure of 100 p.s.i.g. were used in all experiments of this example. Other experimental conditions, along with the experimental results, were as follows:

| Leach temp., °C. | Composition of leach solution | | | Maximum pressure, p.s.i.g. | Extractions (percent) | |
|---|---|---|---|---|---|---|
| | $NH_3$ (g./liter) | $(NH_4)_2CO_3$ (mol) | NaCl percent | | Cu | Ni |
| 150 | 100 | 2 | Nil | 370 | 77 | 63 |
| 150 | 100 | 2 | 3.1 | 400 | 78 | 65 |
| 175 | 100 | 3 | Nil | 940 | 83 | 72 |
| 175 | 100 | 3 | 3.1 | 670 | 87 | 75 |
| 200 | 100 | 2 | Nil | 750 | 71 | 33 |
| 200 | 100 | 2 | 3.1 | 780 | 87 | 52 |
| 200 | 100 | 2 | 12.4 | | 91 | 66 |
| 200 | 200 | 1 | Nil | 710 | 73 | 39 |
| 200 | 200 | 1 | 12.4 | 720 | 91 | 80 |

While in the foregoing specification embodiments of the invention have been described in detail it will be appreciated that numerous changes may be made in those details by those skilled in the art without departing from the spirit and principles of the invention.

What I claim is:

1. The process of extracting copper, nickel, cobalt and molybdenum from deep sea manganese nodules wherein iron, copper, nickel, cobalt and molybdenum is present in the deep sea nodules as oxides or mixed oxides and said manganese is present as manganese dioxide consisting of steps of
    (a) charging raw untreated deep sea manganese nodules and a leach solution of aqueous ammonia and a compound selected from an ammonium salt, sodium chloride and mixtures thereof to a pressure vessel to provide a solid-liquid suspension of nodules and leach solution,
    (b) heating the solid-liquid suspension in the pressure vessel under reducing conditions to a temperature between about 100 and 300° C. wherein the maximum pressure attained in the pressure vessel is at least 300 p.s.i.g. up to about 1000 p.s.i.g. whereby the copper, nickel, cobalt and molybdenum are selectively leached from the deep sea manganese nodules,
    (c) separating a pregnant leach solution from the manganese and iron containing residue whereby the pregnant leach solution contains copper, nickel, cobalt and molybdenum and is substantially free from iron and manganese in solution, and
    (d) recovering the copper, nickel, cobalt and molybdenum from the pregnant leach solution.

2. The process of claim 1 wherein the deep sea manganese nodules are ground to a size to pass through an opening 0.0787 inch across.

3. The process of claim 2 wherein the aqueous leach solution contains from about 50 to 200 gm. per liter ammonia and from about 1 molar to about 6 molar of an ammonium salt selected from ammonium chloride, ammonium carbonate, ammonium sulfate and mixtures thereof.

4. The process of claim 3 wherein the solid-liquid suspension in the pressure vessel is maintained at a temperature for at least thirty minutes up to about four hours.

5. The process of claim 3 wherein, the pressure vessel, prior to heating, is purged with a gas selected from inert gases and reducing gases.

6. The process of claim 5 wherein the reducing gases are selected from carbon monoxide, hydrogen, mixtures of carbon monoxide and hydrogen, water gas, producer gas, synthesis gas, mixtures of carbon dioxide and carbon monoxide, and mixtures of nitrogen and carbon monoxide.

7. The process of claim 4 wherein the initial pressure in the pressure vessel is from about 14.7 p.s.i.a. up to about 300 p.s.i.g.

8. The process of extracting copper and nickel from deep sea manganese nodules wherein iron, copper, and nickel is presented in the deep sea nodules as oxides or mixed oxides and manganese is present as manganese dioxide consisting of the steps of
    (a) grinding previously untreated deep sea manganese nodules to a size to pass through Sieve No. 10, U.S. Sieve Series;
    (b) charging the ground nodules and an aqueous leach solution to a pressure vessel whereby a solid-liquid suspension is formed, the leach solution containing from about 50 to about 200 gm. per liter ammonia and from about 1 molar to about 6 molar of an ammonium salt selected from ammonium chloride, ammonium carbonate and ammonium sulfate,
    (c) heating the solid-liquid suspension in the pressure vessel under reducing conditions to a temperature of from about 100 to about 300° C. whereby the maximum pressure attained in the pressure vessel is from about 300 to about 1000 p.s.i.g.,
    (d) maintaining the solid-liquid suspension at the selected temperature and pressure up to about four hours,
    (e) cooling the solid-liquid suspension to room temperature,
    (f) separating a copper and nickel rich leach solution from the manganese and iron containing residue whereby the copper and nickel rich leach solution is substantially free from iron and manganese in solution, and
    (g) recovering the copper and nickel from the copper and nickel rich leach solution.

9. The process of claim 8 wherein the pressure vessel, prior to heating, is purged with a gas selected from inert gases and reducing gases.

10. The process of claim 8 wherein the pressure vessel, prior to heating, is purged with a gas selected from nitrogen, argon, carbon monoxide, hydrogen, water, gas, producer gas, synthesis gas, mixtures of carbon monoxide and carbon dioxide, mixtures of hydrogen and carbon monoxide; and mixtures of nitrogen and carbon monoxide.

11. The process of claim 10 wherein the purging gas has an over-pressure of from about 14.7 p.s.i.a. up to about 300 p.s.i.g.

References Cited

UNITED STATES PATENTS

| | | | |
|---|---|---|---|
| 3,146,091 | 8/1964 | Green | 75—21 |
| 2,363,315 | 11/1944 | Grothe | 75—103 |
| 2,663,618 | 12/1958 | Babbitt | 75—103 |
| 2,608,463 | 8/1952 | Dean | 75—103 |
| 3,169,856 | 2/1965 | Mero | 75—103 |
| 2,711,958 | 6/1965 | Schaufelberger | 75—103 |
| 648,354 | 4/1900 | Collins | 75—103 |
| 3,471,285 | 10/1969 | Rolf | 75—103 |

WINSTON A. DOUGLAS, Primary Examiner

P. D. ROSENBERG, Assistant Examiner

U.S. Cl. X.R.

75—21, 117, 119